A. M. George,
Dressing Stone.
N° 15,335. Patented July 15, 1856.
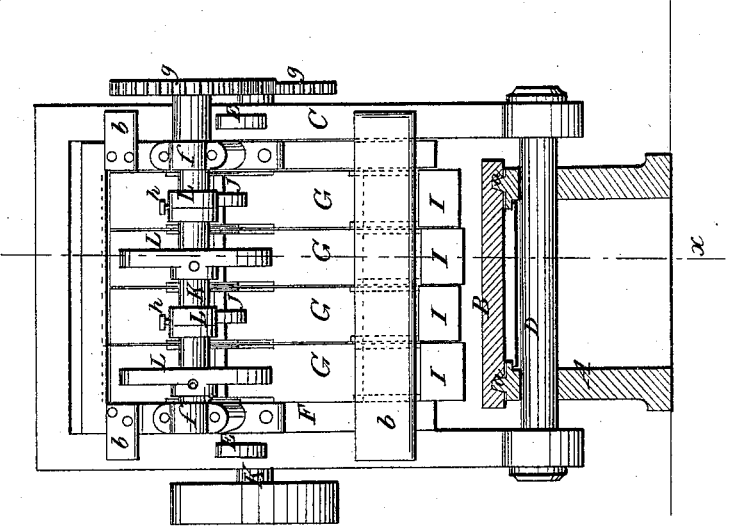
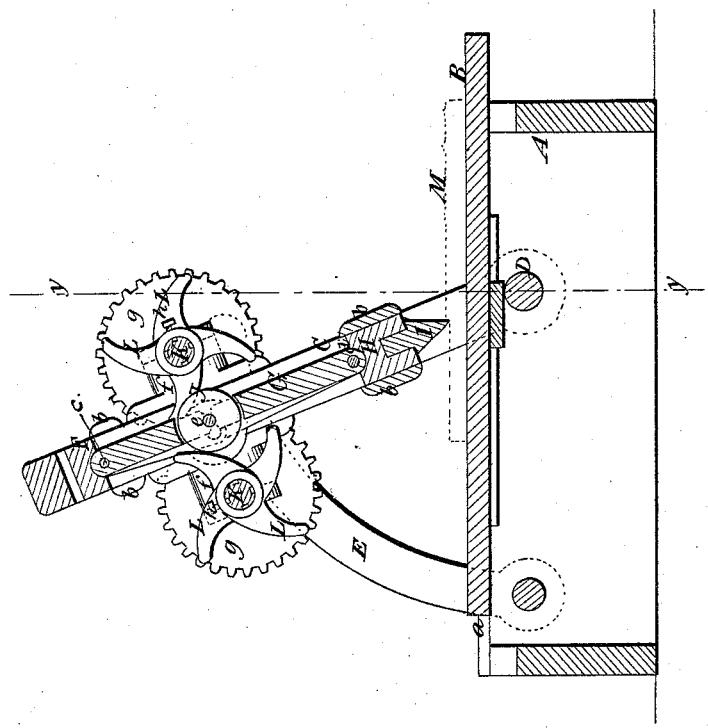

UNITED STATES PATENT OFFICE.

A. M. GEORGE, OF NEW YORK, N. Y.

STONE-DRESSING MACHINE.

Specification of Letters Patent No. 15,335, dated July 15, 1856.

*To all whom it may concern:*

Be it known that I, A. M. GEORGE, of the city, county, and State of New York, have invented a new and Improved Machine for Dressing Stone; and I do hereby declare that the following is a full, clear, and exact description of the same, reference being had to the annexed drawings, making a part of this specification, in which—

Figure 1 is a longitudinal vertical section of my improvement, (*x*), (*x*), Fig. 2 showing the plane of section. Fig. 2, is a transverse vertical section of the same (*y*), (*y*), Fig. 1, showing the plane of section.

Similar letters of reference indicate corresponding parts in the two figures.

My invention consists in attaching a series of knives or cutters to toggles which are placed or fitted in an adjustable or sliding frame and operating said toggles so that a reciprocating motion may be given the knives or cutters by means of arms placed upon two rotating shafts, one at each side of the toggles, said arms as the shafts rotate acting upon friction rollers placed at the joints of the toggles as will be presently shown and described, said invention being an improvement on the stone-dressing machine of Nichols & George, patented Decr. 18th, 1855.

To enable those skilled in the art to fully understand and construct my invention, I will proceed to describe it.

A, represents a rectangular framing on the upper part of which a carriage B, is placed, said carriage working upon suitable ways or guides (*a*), (*a*).

C, is a frame the lower part of which is fitted upon a shaft D, which passes transversely through the framing A, the shaft D, being allowed to slide longitudinally in the framing A. The lower end of the frame C, is also allowed to turn on the shaft D, and the frame C, is supported at any required angle over the carriage B, by segment arms E, E, which pass through the side pieces of the frame C. Within the frame C, a frame F, is fitted the frame F having guide strips (*b*), attached to it which guide strips fit over the side pieces of the frame C. The frame F, therefore may be moved or adjusted within the frame C, that is, raised or lowered as desired. Within the frame F, a series of toggles G, are fitted side by side. The upper ends of the toggles have a rod (*c*), passing through them and the lower ends are connected by joints (*d*), to slides H, which have knives or cutters I, attached to them, said knives or cutters being of chisel form as plainly shown in the drawings. The slides H, are fitted between the lower guide strips which pass entirely across the lower part of the frame F, as shown clearly in Fig. 2. At the joint of each toggle G, there is placed a friction roller J. These rollers are placed loosely on the rods (*e*), of the joints and fit in slots in the toggles so that they may turn without interfering in any way with the perfect operation of the toggles.

At each side of the frame F, there is placed a shaft K, one shaft being at the front and the other at the back sides of the toggles. These shafts work in bearings (*f*), attached to the side pieces of the frame F. One end of these shafts are connected by gear wheels (*g*), (*g*). Each shaft is grooved longitudinally and has arms L, attached to it the shafts passing through the centers of the arms which are somewhat curved and project at equal distances from opposite sides of the shafts. The arms are secured to the shafts by set screws (*h*), which pass through collars or flanches at the centers of the arms and into the grooves in the shafts, see Fig. 1. The arms are placed in opposite positions on the shafts, that is, the arms on the shafts are placed at right angles to those on the opposite shaft, and every alternate arm on each shaft is placed at right angles to the intermediate ones.

Operation: The stone M, to be dressed is placed upon the carriage B, and underneath the knives or cutters I. Motion is then given one of the shafts K, in any proper manner and the arms L, act upon the rollers J, of the toggles the arms on one shaft forcing the knives or cutters I, down upon the stone, and the arms on the other shaft raising them, the stone being fed along underneath the cutters by the carriage B, which is operated by any proper feed movement.

After the stone has been passed once underneath the knives or cutters, ridges will be left on the stone in consequence of the stone being untouched underneath the spaces between the knives or cutters. These ridges are smoothed by showing the shaft D, in the framing A, so that the knives or cutters will operate on the ridges during a succeeding operation.

When the arms L, are placed on the shafts K, as shown in the drawings every alternate knife or cutter will be operated simultaneously. They all however may be operated simultaneously by placing the arms on each shaft in line with each other or in the same position, or they may be operated successively or one after the other by placing the arms spirally upon the shafts.

The above invention is simple economical to manufacture and is not liable to get out of repair.

A patent was formerly granted to George & Nichols for a stone dressing machine in which the toggles were used, but the toggles were operated by eccentrics. This mode of operation is attended with considerable friction, and considerable power is required to drive the machine. In my improved machine the toggles are also used; but in operating them by means of the arms, L, placed on shafts, K, one at each side of the toggles, the toggles are operated with comparatively little friction and a corresponding diminution of power.

I do not claim separately the toggles G, with cutters I, attached for they have been previously used, but What I do claim as new and desire to secure by Letters Patent, as an improvement on the stone dressing machine of Nichols & George, patented December 18th, 1855, is—

The toggles G, with the rollers J, and knives or cutters I, attached in combination with the rotating shafts K, K, with the adjustable arms L, upon them the above parts being arranged and operating substantially as shown for the purpose specified.

A. M. GEORGE.

Witnesses:
DANIEL WARD,
JAMES McKINNEY.